United States Patent

Strotzer et al.

(10) Patent No.: US 8,747,288 B2
(45) Date of Patent: Jun. 10, 2014

(54) POWER CONTROL OF A ROBOTIC TOOL CHANGER

(75) Inventors: Alexander Strotzer, Apex, NC (US); Michael E. Coyle, Raleigh, NC (US)

(73) Assignee: ATI Industrial Automation, Inc., Apex, NC (US)

( * ) Notice: Subject to any disclaimer, the term of this patent is extended or adjusted under 35 U.S.C. 154(b) by 1136 days.

(21) Appl. No.: 12/699,687

(22) Filed: Feb. 3, 2010

(65) Prior Publication Data

US 2010/0197472 A1 Aug. 5, 2010

Related U.S. Application Data (60) Provisional application No. 61/149,932, filed on Feb. 4, 2009.

(51) Int. Cl.
*B23Q 3/155* (2006.01)
*B25J 15/04* (2006.01)
*B25J 19/06* (2006.01)

(52) U.S. Cl.
USPC ........ 483/1; 483/2; 483/10; 483/16; 483/901; 361/3; 439/181; 439/188; 901/49

(58) Field of Classification Search
USPC ......... 483/2, 901, 7, 10, 11, 12, 58–59, 16, 1; 361/3
See application file for complete search history.

(56) References Cited

U.S. PATENT DOCUMENTS

| | | | | |
|---|---|---|---|---|
| 5,002,500 A | * | 3/1991 | Zuccaro et al. | 439/348 |
| 5,372,567 A | * | 12/1994 | Whittington et al. | 483/901 |
| 5,460,536 A | * | 10/1995 | Cullen | 439/289 |
| 6,840,895 B2 | * | 1/2005 | Perry et al. | 483/1 |
| 7,145,758 B2 | * | 12/2006 | King et al. | 361/3 |
| 7,328,086 B2 | * | 2/2008 | Perry et al. | 700/245 |
| 7,374,524 B2 | * | 5/2008 | McCormick | 483/4 |
| 8,132,816 B2 | * | 3/2012 | Norton et al. | 279/2.19 |
| 2012/0277080 A1 | * | 11/2012 | Strotzer | 483/1 |

OTHER PUBLICATIONS

Applied Robotics Inc., "Sigma Tool Change System", Sigma Fiber Optic Module Users Guide, Mar. 24, 2006, pp. 1-25, Guide: 95001_English Rev. 00, Applied Robotics Inc., Glenville, NY.

* cited by examiner

*Primary Examiner* — Erica E Cadugan
(74) *Attorney, Agent, or Firm* — Coats & Bennett, PLLC (57) ABSTRACT

A robotic tool changer removably attaches a robotic tool to a robotic arm. The changer includes a tool module connected to the robotic tool, and a master module connected to the robotic arm. To attach and detach the robotic tool, the changer couples and uncouples the tool module and the master module. A master electrical signal module (ESM) affixes to the master module and a tool ESM affixes to the tool module. In accordance with design requirements, the changer applies the same power supply to both the master ESM and the tool ESM. The changer, however, selectively suppresses application of the power supply to the tool ESM, while maintaining application of the power supply to the master ESM, during the coupling or uncoupling of the master module and the tool module. In doing so, the changer enables such coupling and uncoupling, while also preventing the formation of transient electric arcs.

17 Claims, 12 Drawing Sheets

POWER CONTROL OF A ROBOTIC TOOL CHANGER

This application claims priority under 35 U.S.C. §119(e) from Provisional Patent Application No. 61/149,932, filed Feb. 4, 2009, the entire contents of which are incorporated herein by reference.

TECHNICAL FIELD

The present invention relates generally to the field of robotics and in particular to power control of a robotic tool changer.

BACKGROUND

Robots are widely utilized in industrial assembly line and other manufacturing applications to perform repetitive tasks very precisely without the need for human operation, interaction, or supervision. For example, robots are commonly used in the automotive industry to perform a number of tasks such as material handling, cutting, welding, and the like.

To amortize the considerable cost of an industrial robot over a variety of tasks, the robot arm is typically separate from a diverse array of robotic tools, which are removably attached to the end of the robot arm. Different tools are removably attached in such a way through use of a tool changer. The tool changer consists of a body for mechanically attaching the robot arm to a tool and one or more utility modules connected to that body for passing various utilities, such as electrical power, between the robot arm and the tool. Specifically, one half of the tool changer body, called the master module, is permanently affixed to the robot arm. The other half, called the tool module, is affixed to each tool that the robot may utilize. When the robot arm positions the master module adjacent the tool module connected to a desired tool, the master module actuates a coupler to mechanically attach the master and tool modules together.

With the master and tool modules so attached, utility modules may provide for the passing of utilities between the robot and a tool. For example, a master electrical signal module may be affixed to the master module and a tool electrical signal module may be affixed to the tool module. The master electrical signal module includes electrical contacts that mate with those of the tool electrical signal module when the master and tool modules are coupled together. With these electrical contacts mated, electrical power is transferred from one or more power supplies, across the master and tool electrical signal modules, and made available at the tool.

Design restrictions of many tool changer applications dictate that electrical power transferred to the tool electrical signal module must be shared with the master electrical signal module (i.e., the master electrical signal module and the tool electrical signal module must use the same one or more power supplies). Accordingly, because the master electrical signal module must provide electrical control signals to the master module for actuating the coupler, the one or more power supplies must remain on during the coupling and uncoupling of the master and tool modules. As a result, transient electric arcs form across the electrical contacts of the master electrical signal module and the tool electrical signal module during the coupling/uncoupling process. Especially when high inrush current exists, arcing accelerates the wear of the contacts and thereby diminishes the contacts' electrical life below their mechanical life.

Various methods are known to mitigate damage to the electrical contacts caused by arcing. Improving the material composition of the electrical contacts, for example, permits the contacts to better withstand the strain of arcing. These methods, however, merely prolong the electrical life of the contacts (e.g., to a point still short of their mechanical life) because arcing still occurs.

SUMMARY

Methods and apparatus disclosed herein advantageously control the power of a robotic tool changer to prevent arcing across the electrical contacts of a master electrical signal module and a tool electrical signal module. Instead of merely prolonging the electrical life of the electrical contacts, the present invention allows the contacts to reach their mechanical life. The present invention also conforms to design requirements of many tool changer applications by powering both the master electrical signal module and the tool electrical signal module with the same one or more power supplies.

More particularly, the one or more power supplies apply power to the master electrical signal module throughout a coupling and uncoupling process to permit the master module to actuate a coupler. A power switch circuit, however, suppresses application of the one or more power supplies to the tool electrical signal module throughout the coupling and uncoupling process to prevent arcing across the electrical contacts of the tool changer.

One embodiment of the present invention comprises, for example, powering the master electrical signal module via a first circuit connected to one or more power supplies and powering the tool electrical signal module via a second circuit connected to the same one or more power supplies that is electrically parallel to the first circuit. The tool changer detects a tool electrical signal module power control signal associated with the uncoupling of the master module and the tool module and, responsive thereto, breaks the second circuit while maintaining the first circuit. Because the tool changer maintains the first circuit, the tool changer may uncouple the master module and tool module (e.g., by the master module actuating a coupler). During this uncoupling process, however, no arcing occurs across the electrical contacts because the tool changer has broken the second circuit and prevented the application of power to the tool electrical signal module. Thus, the tool changer allows the electrical contacts to reach their mechanical life.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
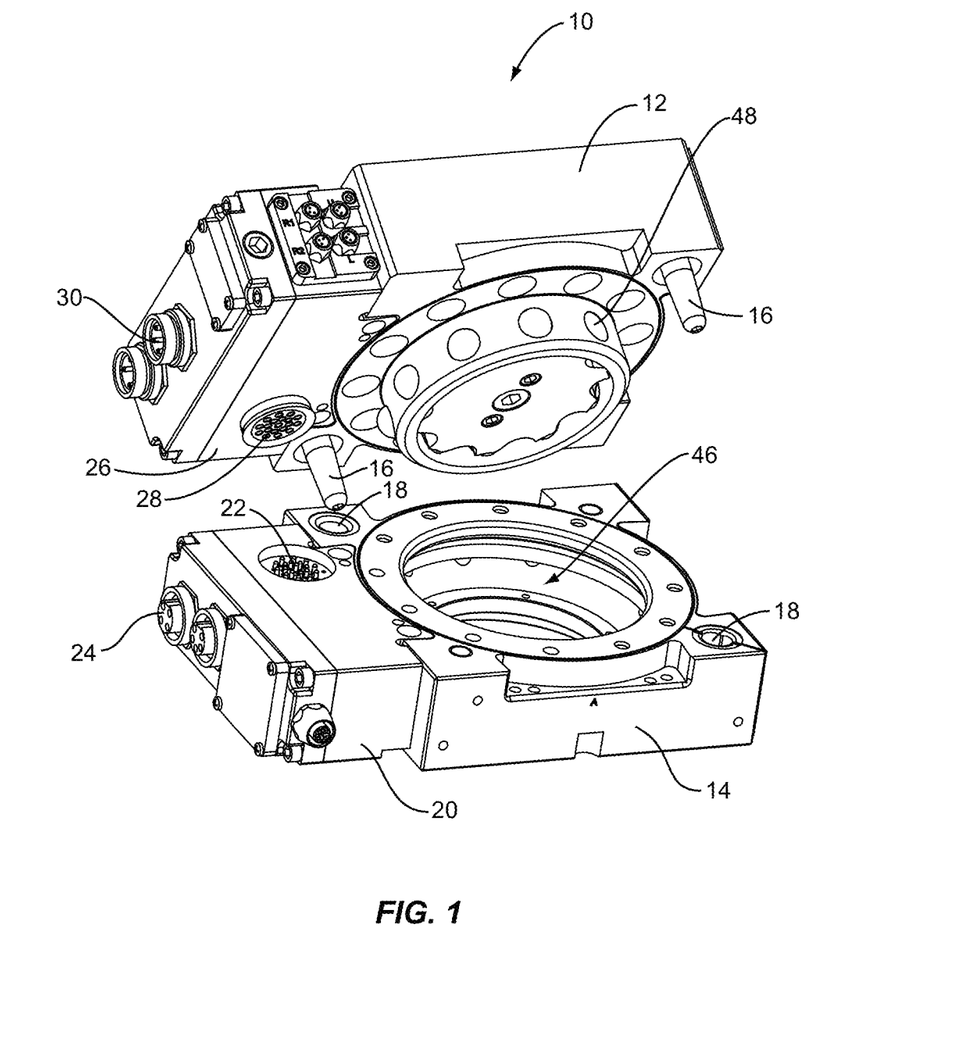
FIG. 1 illustrates a robotic tool changer of the present invention.

FIG. 1 depicts a robotic tool changer 10 according to one embodiment of the present invention. The robotic tool changer 10 comprises a master module 12 adapted to be connected to a robotic arm (not shown) and a tool module 14, adapted to be connected to a robotic tool (not shown). The robotic tool changer 10 allows users to selectively attach different tools to a robotic arm by selectively coupling and uncoupling the master module 12 and the tool module 14.

In the embodiment depicted in FIG. 1, alignment pins 16 on the master module 12 are inserted into alignment holes 18 formed in the tool module 14, to assist in achieving proper alignment between the master module 12 and the tool module 14 during the coupling and uncoupling process. The process of coupling the master and tool modules 12, 14 includes inserting a collar 48 protruding from the surface of the master module 12 into a central chamber 46 formed in the tool module 14. The process of uncoupling the modules 12, 14 includes removing the collar 48 from the central chamber 46. In one embodiment, these processes are performed automatically upon the master module receiving an electrical control signal directing it to couple or uncouple the modules 12, 14. Those skilled in the art will readily appreciate, however, that the coupling and uncoupling mechanisms shown are merely for illustrative purposes. Indeed, the present invention of power control is not limited by such mechanisms.

Regardless of the specific coupling or uncoupling mechanisms, the tool changer 10 provides for the passing of electrical power between one or more power supplies and a robotic tool. For example, FIG. 1 depicts a tool electrical signal module 20 affixed to the tool module 14. The tool electrical signal module 20 includes tool-side electrical contacts 22 connected internally to one or more connectors 24. A master electrical signal module 26 is affixed to the master module 12. The master electrical signal module 26 includes robot-side electrical contacts 28 adapted and disposed to mate with the tool-side electrical contacts 22 when the master and tool modules 12, 14 are coupled together. The robot-side electrical contacts 28 are connected internally to one or more connectors 30. Electrical power may flow, for example, from one or more power supplies (not shown) via connectors 30 and robot-side electrical contacts 28 to tool-side electrical contacts 22 and connectors 24 when the master and tool modules 12, 14 are coupled together, and thence from connectors 24 to an attached tool (not shown).

Figure 2:
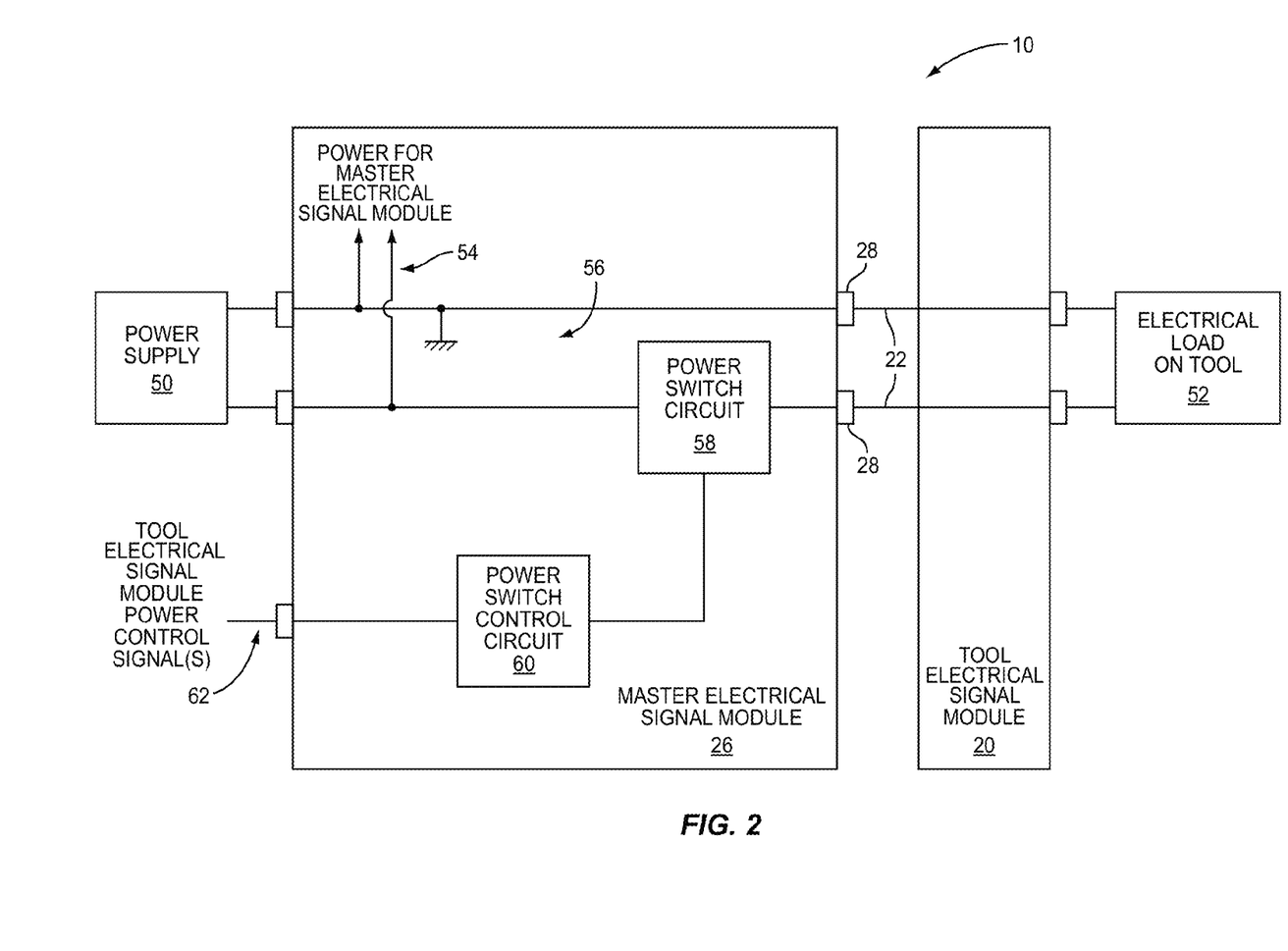
FIG. 2 is a block diagram illustrating one embodiment of a robotic tool changer with the power control of the present invention.

Notably, the present invention controls this flow of electrical power to prevent arcing across the electrical contacts 28, 22 when the master and tool modules 12, 14 are being coupled and uncoupled (i.e., when the electrical contacts 28, 22 of the master and tool electrical signal modules 26, 20 are being mated and unmated). FIG. 2, for example, illustrates these electrical contacts 28, 22 and a power switch circuit 58 for controlling the application of one or more power supplies 50 to an electrical load on a tool 52 via the modules 26, 20. The one or more power supplies 50 may comprise, for example, two 24V DC power supplies. In conformance with the design requirements of many tool changer applications, the one or more power supplies 50 are shared by both the master and tool electrical signal modules 26, 20. The one or more power supplies 50 apply power to the master electrical signal module 26 throughout the coupling and uncoupling process. Such power permits the master electrical signal module 26 to send an electrical control signal to the master module 12 directing it to actuate a coupler (e.g., the collar 48 in FIG. 1). The power switch circuit 58, however, suppresses application of the one or more power supplies 50 to the tool electrical signal module 20 throughout the coupling and uncoupling process to prevent arcing across the electrical contacts 28, 22.

More particularly, the one or more power supplies 50 power the master electrical signal module 26 via a first circuit 54 connected thereto. The one or more power supplies 50 also power the tool electrical signal module 20 via a second circuit 56 connected thereto that is electrically parallel to the first circuit 54. (The second circuit 56 is electrically parallel to the first circuit 54 so that breaking of either circuit 56, 54 does not prevent the provision of power via the other). The power switch circuit 58 is disposed in series along the second circuit 56 in the path of one or more poles of the circuit 56 (e.g., FIG. 2 illustrates the power switch circuit 58 disposed in the path of the positive pole, but it could also be disposed in the path of the negative pole).

Regardless of its specific disposition, the power switch circuit 58 maintains the first circuit 54 connected between the one or more power supplies 50 and the master electrical signal module 26 throughout the coupling and uncoupling process, but breaks the second circuit 56 connected between the one or more power supplies 50 and the tool electrical signal module 20 during such a process. In doing so, the power switch circuit 58 prevents arcing across the electrical contacts 28, 22 when the master and tool modules 12, 14 are in the process of being coupled and uncoupled. Accordingly, the power switch circuit 58 allows the contacts 28, 22 to reach their mechanical life. The power switch circuit 58 also permits application of the one or more power supplies 50 to the tool electrical signal module 20 when the master and tool modules 12, 14 have been coupled. That is, when the modules 12, 14 have been coupled and are no longer in a transient state, the power switch circuit 58 establishes or re-establishes the second circuit 56. This allows for electrical operation of the tool attached to the tool module 12 once the modules 12, 14 have been coupled together.

To apply and suppress the application of the one or more power supplies 50 in this manner, the power switch circuit 58 is controlled by a power switch control circuit 60. The power switch control circuit 60 directs the power switch circuit 58 to break the second circuit 56 during the coupling and uncoupling process and to establish or re-establish the second circuit 56 at other times (e.g., when the master and tool modules 12, 14 have been coupled). Specifically, the power switch control circuit 60 receives one or more tool electrical signal module power control signals 62 that are associated with the coupling and uncoupling process. These one or more signals 62 indicate to the power switch control circuit 60 that the coupling and uncoupling process is occurring or is about to occur. Responsive to the one or more signals 62, the power switch control circuit 60 directs the power switch circuit 58 to break or establish the second circuit 56 connected between the one or more power supplies 50 and the tool electrical signal module 20.

Figure 3A:
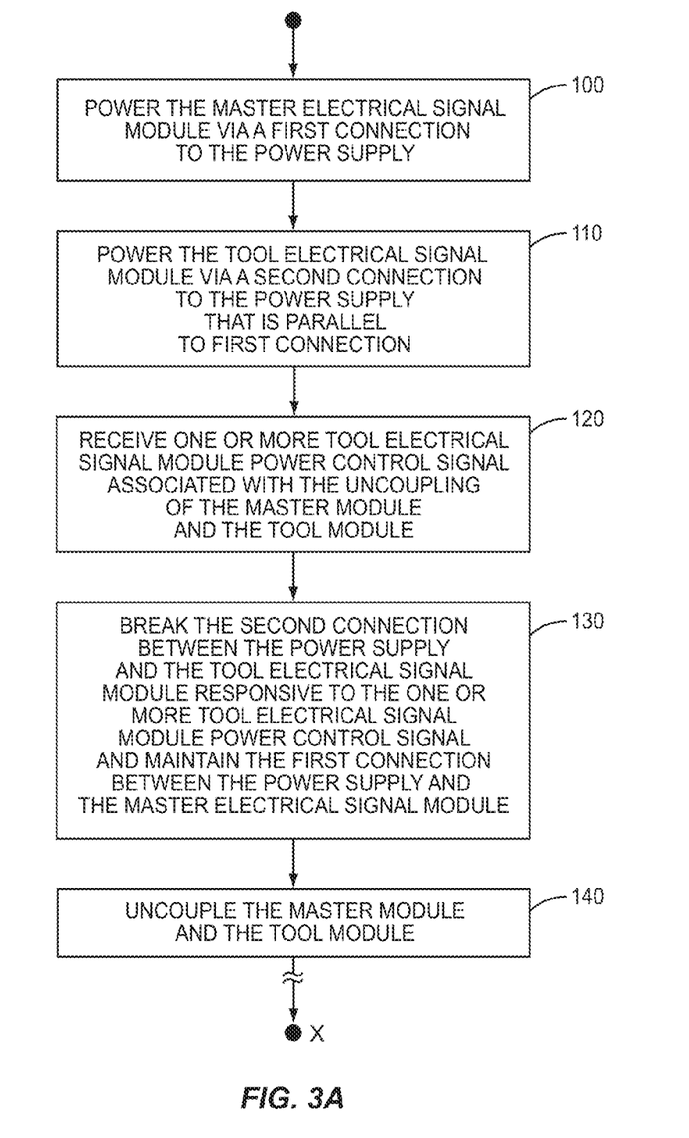
FIGS. 3A and 3B are logic flow diagrams illustrating one or more methods of controlling the power of a robotic tool changer.
Figure 3B:
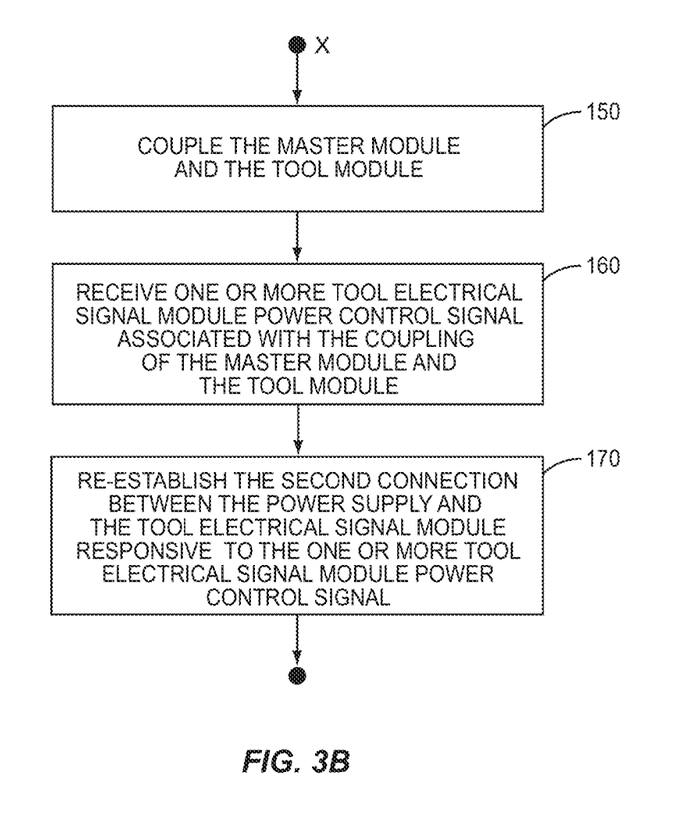

With the above points of variation and implementation of the robotic tool changer 10 in mind, those skilled in the art will appreciate that the tool changer 10 of the present invention generally performs the method illustrated in FIGS. 3A (uncoupling) and 3B (coupling). According to FIG. 3A, the robotic tool changer 10 powers the master electrical signal module 26 via a first circuit 54 connected to the one or more power supplies 50 (Block 100) while powering the tool electrical signal module 20 via a second circuit 56 connected to the same one or more power supplies 50 (Block 110). The second circuit 56 is electrically parallel to the first circuit 54 so that breaking of the second circuit 56 does not prevent the provision of power via the first circuit 54. To discriminate when to break the second circuit 56, however, the tool changer 10 receives one or more tool electrical signal module power control signals 62 associated with the uncoupling of the master module 12 and the tool module 14 (Block 120). Responsive to these one or more tool electrical signal module power control signals 62, the tool changer 10 (via the power switch circuit 58) breaks the second circuit 56 connected between the one or more power supplies 50 and the tool electrical signal module 20 (Block 130). Because the tool changer 10 maintains the first circuit 54 connected between the one or more power supplies 50 and the master electrical signal module 26, the tool changer 10 may uncouple the master module 12 and tool module 14 (e.g., by the master module 12 actuating a coupler) (Block 140). During this uncoupling process, however, no arcing occurs across electrical contacts 28, 22 because the tool changer 10 has broken the second circuit 56 and prevented the application of power to the tool electrical signal module 20. Thus, tool changer 10 allows the contacts 28, 22 to reach their mechanical life.

Those skilled in the art will readily appreciate, of course, that the method illustrated in FIG. 3A may be performed as part of an ongoing process and may be implemented in conjunction with or independently from the steps illustrated in FIG. 3B. After uncoupling the master module 12 and the tool module 14, for example, the robotic arm may be configured to perform a task with a different tool. To do so, the master module 12 must be coupled to a tool module 14 connected to the different tool. One embodiment of the present invention, therefore, includes the robotic tool changer 10 maintaining the first circuit 54 and keeping the second circuit 56 broken while the master module 12 and the tool module 14 are uncoupled.

Regardless of the status of the second circuit 56 during such time, however, the method may continue according to the steps illustrated in FIG. 3B. In FIG. 3B, when the master module and the tool module are being coupled together (Block 150), the second circuit 56 is or remains broken so that no arcing occurs across the electrical contacts 28, 22. The robotic tool changer 10 receives one or more tool electrical signal module power control signals 62 associated with this coupling (Block 160), such as an indication that the modules 12, 14 have been coupled together. Responsive thereto, the robotic tool changer 10 (via the power switch circuit 58) re-establishes the second circuit 56 connected between the one or more power supplies 50 and the tool electrical signal module 20 (Block 170).

Of course, while the methods illustrated in FIGS. 3A and 3B have been described together in the order of uncoupling followed by coupling, those skilled in the art will appreciate that these methods may be performed together or independently and without regard to such order. Nor is the present invention limited by the manner in which these steps are performed. Indeed, FIG. 4 illustrates one embodiment of the robotic tool changer 10 performing the above-described method through use of specific tool electrical signal module power control signals 62.

Figure 4:
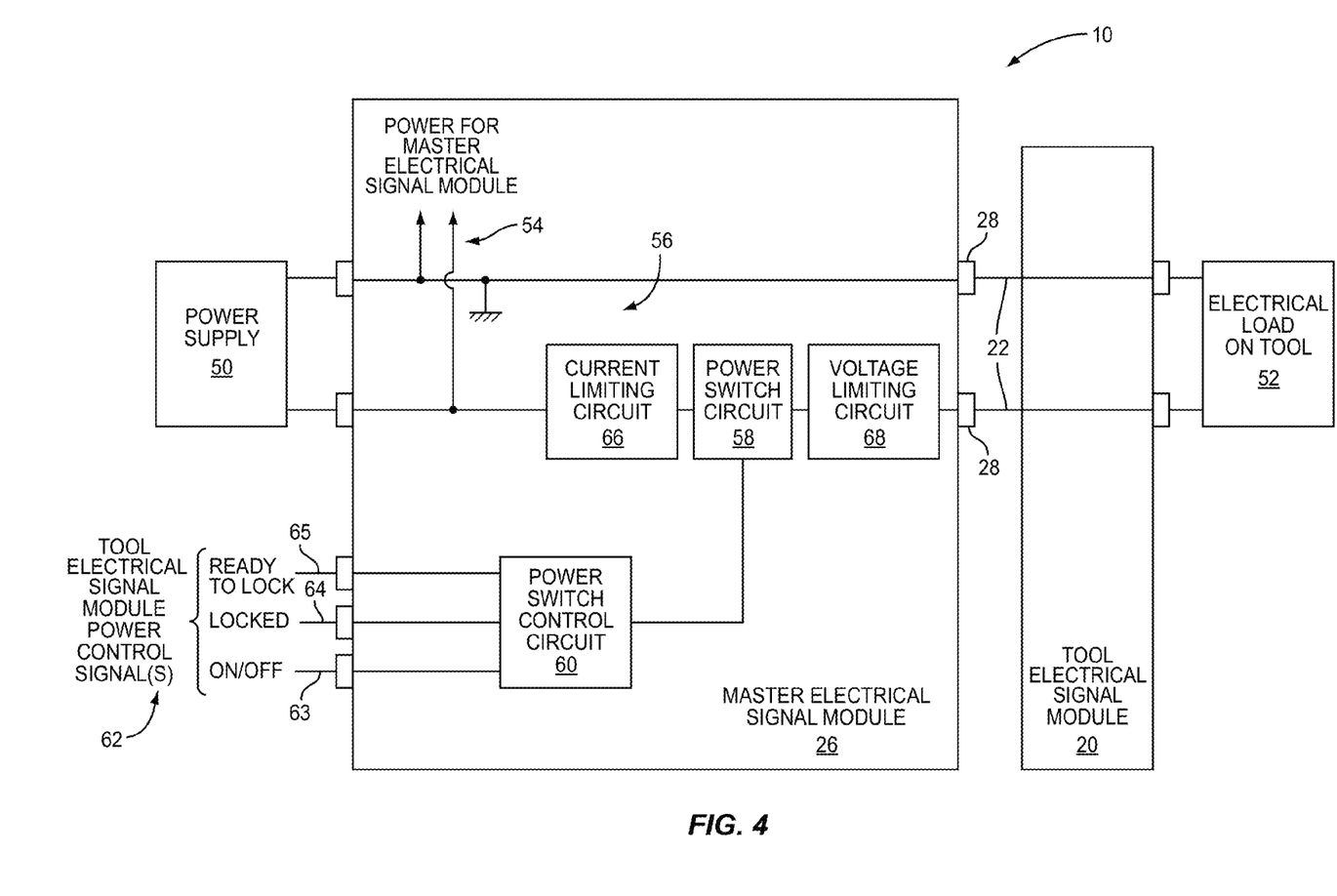
FIG. 4 is a block diagram illustrating one embodiment of a robotic tool changer with power control, exemplary power control signals, and circuits for the protection of a power switch.

In FIG. 4, the tool electrical signal module power control signals 62 comprise three separate signals, namely an ON/OFF signal 63, a LOCKED signal 64, and one or more READY TO LOCK signals 65. The ON/OFF signal 63 represents an explicit control command to the power switch control circuit 60 to either turn power on to the tool electrical signal module 20 (i.e., establish the second circuit 56) or turn power off to the tool electrical signal module 20 (i.e. break the second circuit 56). In one embodiment, for example, a controller of the robot sends an OFF command to the robotic tool changer 10 shortly before commanding the tool changer 10 to uncouple the modules 12, 14. Likewise, the controller sends an ON command to the robotic tool changer 10 shortly after commanding the tool changer 10 to couple the modules 12, 14.

The one or more READY TO LOCK signals 65 and the LOCKED signal 64 each represent a sensing signal that indicates a different stage of uncoupling or coupling of the modules 12, 14. The one or more READY TO LOCK signals 65, for example, indicate that the master and tool modules 12, 14 are close enough for mechanical attachment. The LOCKED signal 64 indicates the modules 12, 14 are sensed as being locked in place via a locking mechanism. These sensing signals 64, 65 are merely illustrative, of course, as the power switch control circuit 60 may be configured to respond to any number or type of sensing signals indicative of the status of uncoupling or coupling of the modules 12, 14. Regardless of the particular sensing signal, therefore, the power switch control circuit 60 may direct the power switch circuit 58 to break or establish the second circuit 56 at any one of a number of stages of the uncoupling or coupling process, respectively.

FIG. 4 also illustrates one embodiment of the robotic tool changer 10 that includes a current limiting circuit 66 and a voltage limiting circuit 68. The current limiting circuit 66, for example, protects the power switch circuit 58 from overload due to high inrush current. The voltage limiting circuit 68 protects the power switch circuit 58 from voltage spikes caused by inductive electrical loads 52. These protection circuits 66, 68, therefore, allow the present invention to utilize certain power switch circuits 58 despite their inability to sustain a given inrush current or voltage spike. Accordingly, as embodiments of the present invention may alternatively utilize a power switch circuit 58 capable of sustaining such high inrush current or voltage spikes, embodiments of the present invention are not limited by the presence of these circuits 66, 68. Nor are embodiments of the present invention limited by the implementation of these, or any other, circuits.

Figure 5:
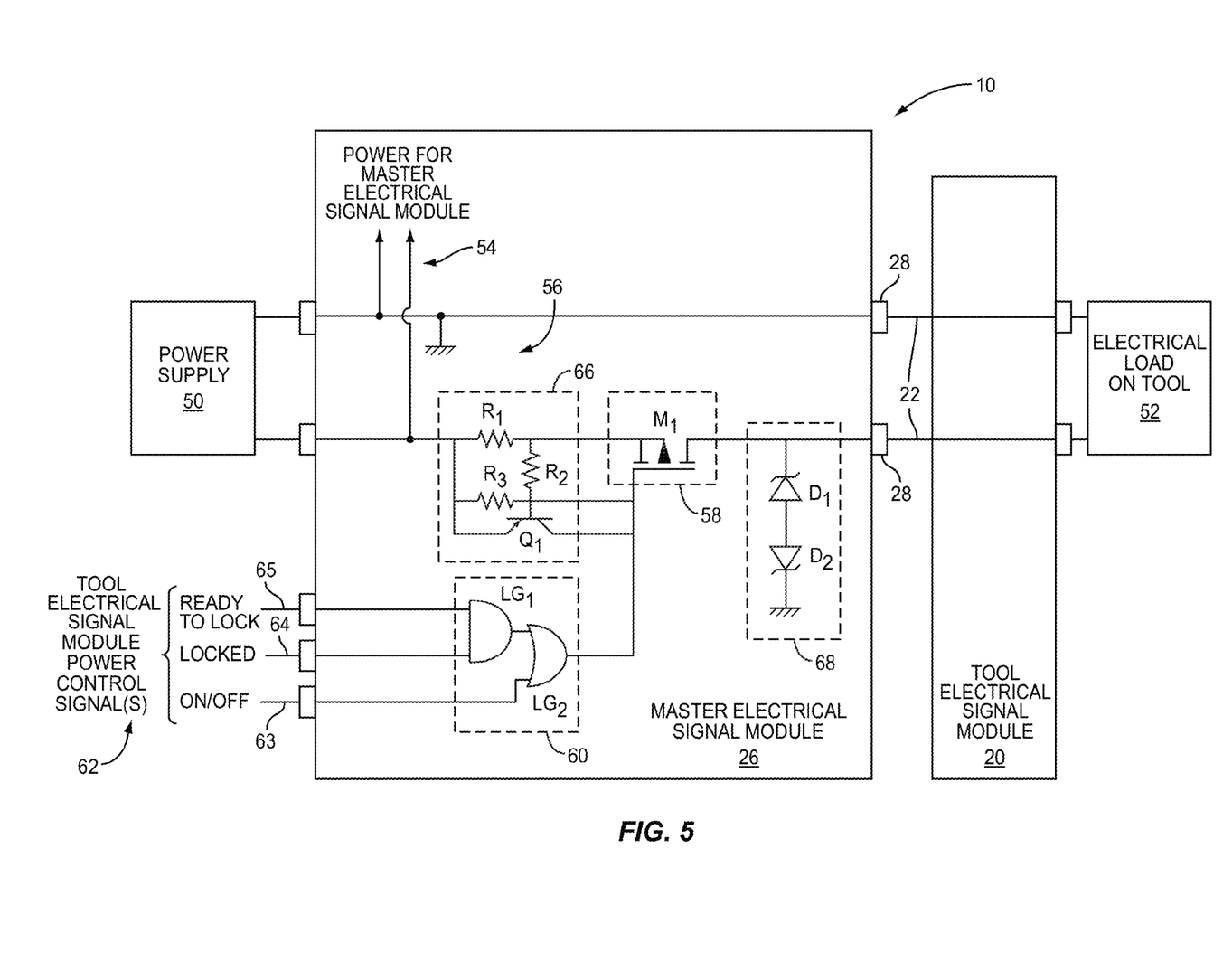
FIG. 5 is a block diagram illustrating an implementation of the robotic tool changer of FIG. 4.

FIG. 5 shows one embodiment of the robotic tool changer 10 according to the present invention. The power switch control circuit 60 comprises a two input AND logic gate $LG_1$ having one READY TO LOCK signal 65 and the LOCKED signal 64 as inputs. The power switch control circuit 60 also comprises a two input OR logic gate $LG_2$ having the result of $LG_1$ and the ON/OFF signal 63 as inputs. As illustrated, therefore, the power switch circuit 58 is controlled by the power switch control circuit 60 responsive to either the ON/OFF signal 63 alone OR the combination of the READY TO LOCK signal 65 AND the LOCKED signal 64.

FIG. 5 illustrates the power switch circuit 58 implemented as a transistor $M_1$. The transistor $M_1$ establishes the second circuit 56 connected between the one or more power supplies 50 and the tool electrical signal module 20 when the output from the power switch control circuit 60 is logically high. This occurs, for instance, when either the ON/OFF signal 63 is high (indicating an explicit control command that the circuit 56 should be established) OR the READY TO LOCK signal 65 AND the LOCKED signal 64 are both high (sensing that the modules 12, 14 are physically close and have been locked together). By contrast, the transistor $M_1$ breaks the second circuit 56 when the output from the power switch control circuit 60 is logically low. This occurs when either the ON/OFF signal 63 is low (indicating an explicit control command that the circuit 56 should be broken) OR at least one of the READY TO LOCK signal 65 AND the LOCKED signal 64 are low (sensing that the modules 12, 14 either are not physically close or have not been locked together).

During the establishment or breaking of the second circuit 56, however, inrush current or voltage spikes may threaten the transistor $M_1$. To prevent such damage, FIG. 5 illustrates an exemplary current limiting circuit 66 and voltage limiting circuit 68. The current limiting circuit 66 includes a transistor $Q_1$ controlled by the network of passive components $R_1$, $R_2$, and $R_3$ to actively regulate the current passing through $M_1$. The voltage limiting circuit 68 includes two opposing zener diodes $D_1$ and $D_2$ configured to clip voltage spikes above or below the operating voltage level of the robotic tool changer 10. With the transistor $M_1$ protected from such inrush current and voltage spikes, the transistor $M_1$ need not be capable of sustaining high levels thereof.

Figure 6:
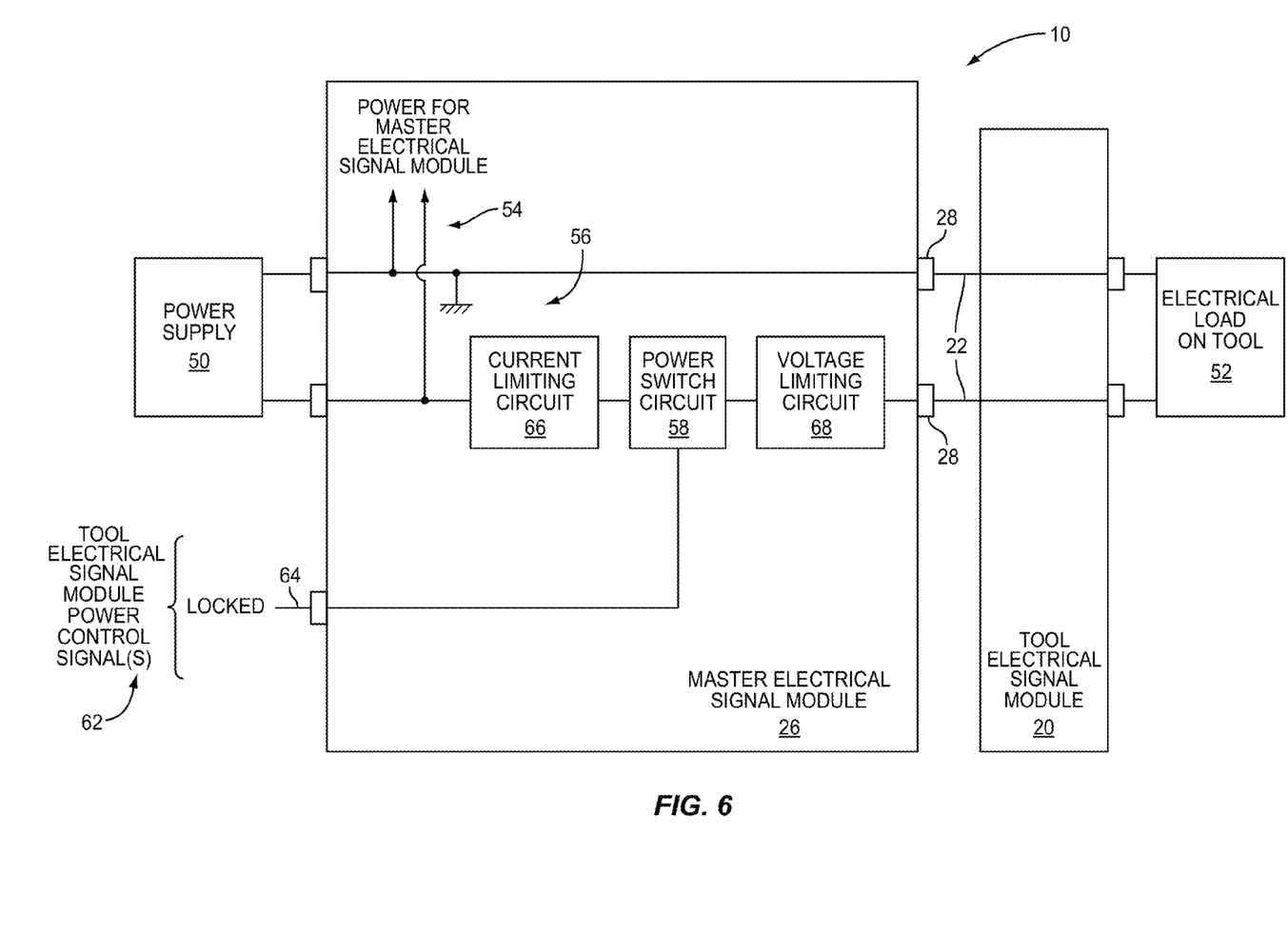
FIG. 6 is a block diagram illustrating one embodiment of a robotic tool changer with alternative power control signals.
Figure 7:
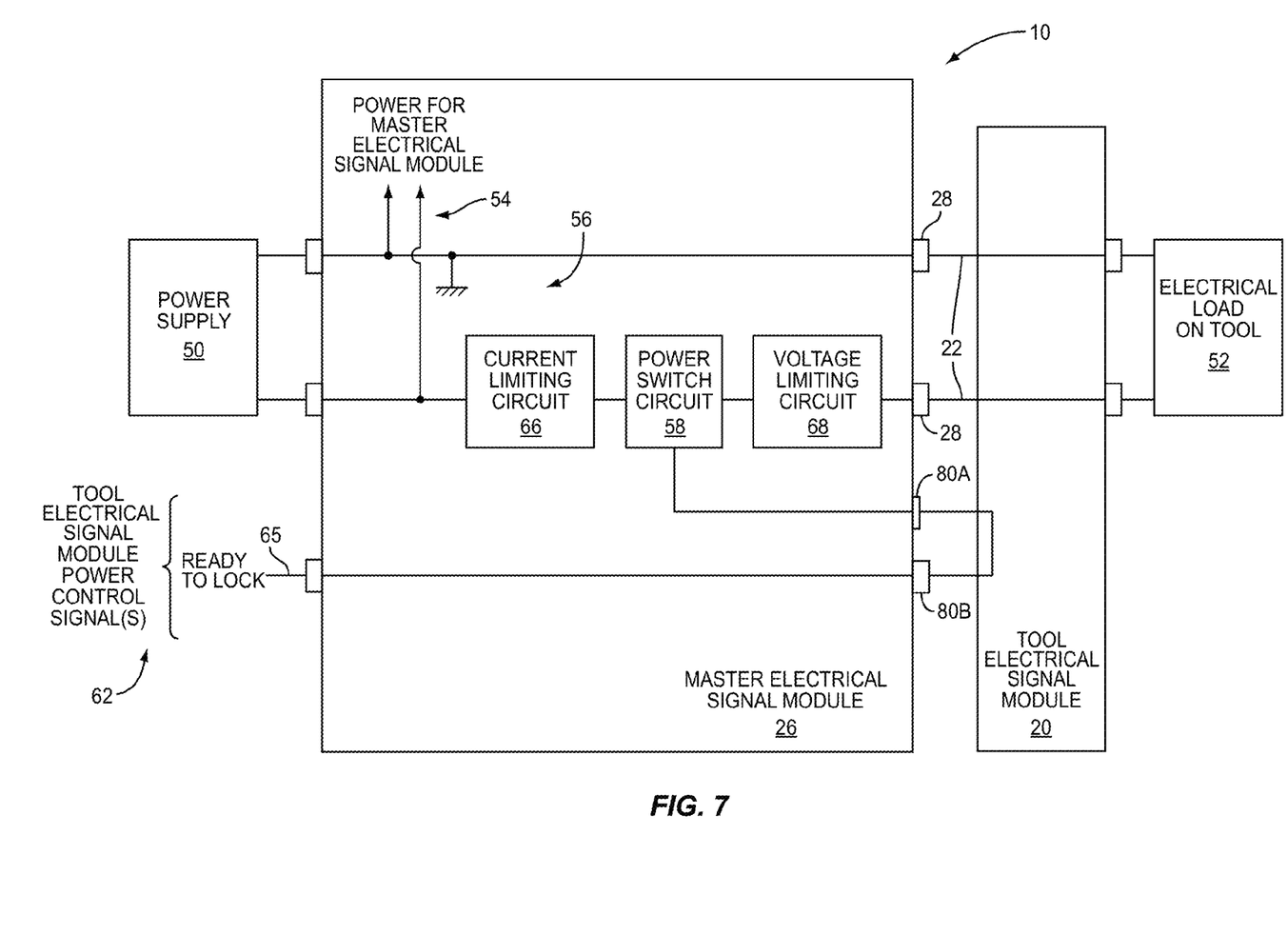
FIG. 7 is a block diagram illustrating one embodiment of a robotic tool changer with yet other alternative power control signals.
Figure 8:
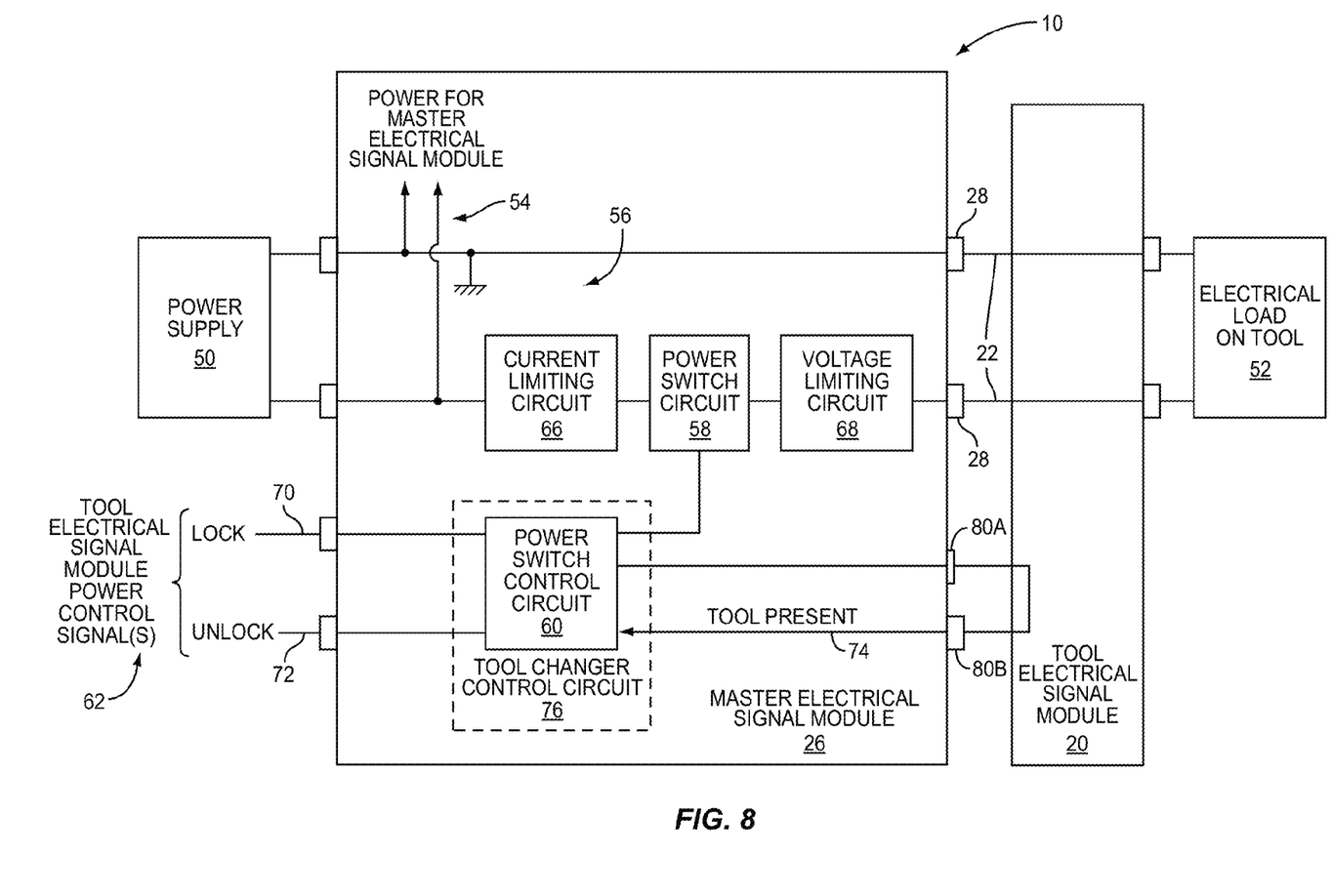
FIG. 8 is a block diagram illustrating one embodiment of a robotic tool changer with, again, alternative power control signals.

FIGS. 6-8 illustrate yet other embodiments of the robotic tool changer 10 that include different tool electrical signal module power control signals 62. FIG. 6 illustrates an embodiment whereby the tool electrical signal module power control signals 62 comprise only the LOCKED signal 64. In this case, the power switch circuit 58 is controlled responsive only to whether the LOCKED signal 64 is logically high or low. (Note that the power switch control circuit 60 is not shown in FIG. 6 because in this embodiment it simply acts as a buffer to isolate the power switch circuit 58 and to otherwise relay the logic high or low of the LOCKED signal 64 to the power switch circuit 58). The power switch circuit 58, therefore, breaks the second circuit 56 when the modules 12, 14 have not been locked together, and re-establishes the second circuit 56 when the modules 12, 14 have been locked together.

While the embodiment in FIG. 6 certainly prevents arcing across the electrical contacts 28, 22, it nonetheless appreciably delays application of power to the robotic tool longer than absolutely necessary to prevent such arcing. More particularly, once the modules 12, 14 are physically close, as indicated by the READY TO LOCK signal 65, a controller of the robot (not shown) sends a LOCK command signal to the tool changer 10 directing it to actuate a locking mechanism to lock the modules 12, 14 together. At some point between the locking mechanism initiating and the modules 12, 14 actually locking together, all of the electrical contacts 28, 22 engage. With all of the electrical contacts 28, 22 engaged, it is at this point when the second circuit 56 could be re-established and power applied to the robotic tool without causing arcing across the electrical contacts 28, 22. The embodiment in FIG. 6, however, delays re-establishing the second circuit 56 and application of power to the robotic tool until some appreciable time after this point (e.g., 100 ms), when the LOCKED signal 64 indicates that the modules 12, 14 have actually been locked together.

FIGS. 7 and 8 illustrate alternative embodiments that minimize this delay. In FIG. 7, the tool electrical signal module power control signals 62 comprise the READY TO LOCK signal 65. The READY TO LOCK signal 65 becomes logically high once the modules 12, 14 are physically close, which may occur before all of the electrical contacts 28, 22 are engaged (and thereby before power can be applied to the robotic tool without causing arcing across the electrical contacts 28, 22). However, the READY TO LOCK signal 65 first passes through a connector 80B, through a circuit path in the tool electrical signal module 20, and then through a physically recessed electrical contact 80A before being input into the power switch circuit 58 (or the power switch control circuit 60, since just as in FIG. 6, the power switch control circuit 60 simply acts as a buffer to isolate the power switch circuit 58 and to otherwise relay the logic high or low of the READY TO LOCK signal 65, once passed through the physically recessed electrical contact 80A, to the power switch circuit 58). Because the electrical contact 80A is physically recessed, it is the last of the electrical contacts to engage. Once passed through the physically recessed electrical contact 80A, therefore, the READY TO LOCK signal 65 indicates both whether the modules 12, 14 are physically close and whether all electrical contacts 28, 22 are engaged. Accordingly, the power switch circuit 58 in FIG. 7 re-establishes the second circuit 56 as soon as the modules 12, 14 are physically close and all electrical contacts 28, 22 are engaged. Likewise, the power switch circuit 58 breaks the second circuit 56 when either the modules 12, 14 are not physically close, or the physically recessed electrical contact 80A is not longer engaged.

In FIG. 8, the tool electrical signal module power control signals 62 comprise a LOCK command signal 70, a corresponding UNLOCK command signal 72, and a TOOL PRESENT signal 74. A controller of the robot sends the LOCK command signal 70 to a tool changer control circuit 76 included in the tool changer 10. Responsive to the LOCK command signal 70 being logically high, the tool changer control circuit 76 directs the master module 12 to actuate a locking mechanism to lock the modules 12, 14 together. The power switch control circuit 60, included in the tool changer control circuit 76 in this embodiment, also receives the LOCK command signal 70, but does not yet direct the power switch circuit 58 to re-establish the second circuit 56. Rather, the power switch control circuit 60 waits until both the LOCK command signal 70 and the TOOL PRESENT signal 74 are logically high. The TOOL PRESENT signal 74 is a sensing signal that is passed from the power switch control circuit 60, through a physically recessed electrical contact 80A, through a circuit path in the tool electrical signal module 20, and then through an electrical contact 80B back to the power switch control circuit 60. Passed through the physically recessed electrical contact 80A, the TOOL PRESENT signal 74 indicates whether all of the electrical contacts 28, 22 are engaged. Accordingly, the power switch control circuit 60 directs the power switch circuit 58 to re-establish the second circuit 56 as soon as the command has been given to lock the module 12, 14 together and all electrical contacts 28, 22 are engaged.

Similarly, the controller of the robot sends the UNLOCK command signal 72 to the tool changer control circuit 76. Responsive to the UNLOCK command signal 72 being logically high, the tool changer control circuit 76 directs the master module 12 to actuate the locking mechanism to unlock the modules 12, 14. The power switch control circuit 60 also receives the UNLOCK command signal 72. As soon as the power switch control circuit 60 receives the UNLOCK command signal 72 (i.e., while all electrical contacts 28, 22 are still engaged), it directs the power switch circuit 58 to break the second circuit 56.

Figure 9:
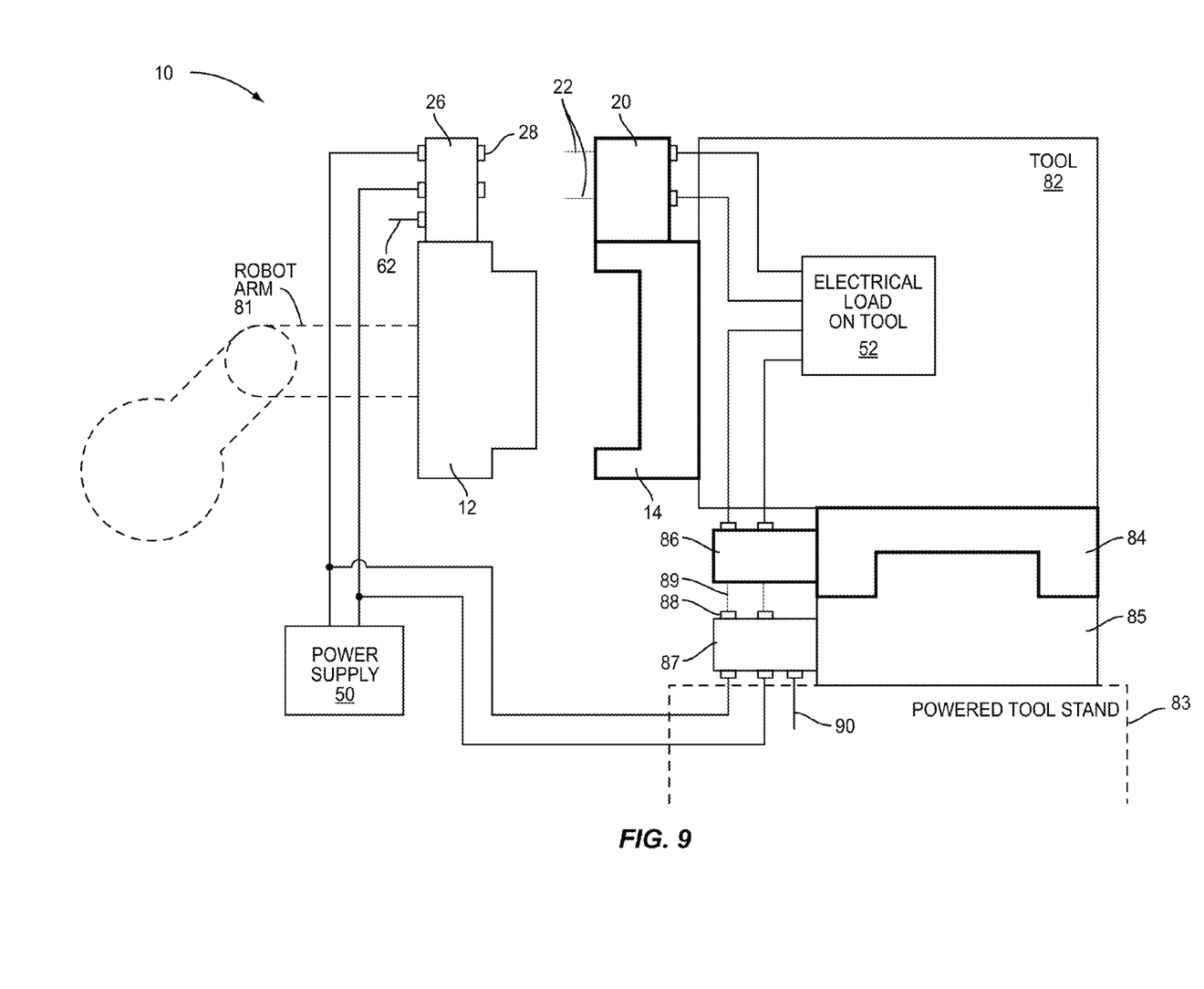
FIG. 9 is a block diagram illustrating an embodiment of a robotic tool changer that is configured to removably attach a robotic tool to a robotic arm, and is also configured to removably dock the robotic tool with a powered tool stand.

FIG. 9 illustrates other embodiments of the robotic tool changer 10. The tool changer 10 in these embodiments includes a first master module 12 that is connected to a first powered endpoint 81 (shown in the example of FIG. 9 as robotic arm 81), and a first tool module 14 that is connected to robotic tool 82. The tool changer 10 removably attaches the robotic tool 82 to the first powered endpoint 81, by coupling and uncoupling the first master module 12 and the first tool module 14 in much the same way as described above. When coupled, the tool changer 10 applies electrical power from the power supply 50 to the tool 82. Electrical power flows, for example, from the power supply 50 to a first master electrical signal module 26 affixed to the first master module 12, from endpoint-side electrical contacts 28 to tool-side electrical contacts 22, and then from a first tool electrical signal module 20 affixed to the first tool module 14 to the tool 82. Similar to the embodiments described above, the tool changer 10 prevents transient electric arcs from forming across electrical contacts 28, 22 by suppressing application of the power supply 50 to the first tool electrical signal module during the coupling or uncoupling of the first master module 12 and the first tool module 14.

The tool changer 10 in FIG. 9, however, is also configured to transfer the robotic tool 82 between the first powered endpoint 81 (i.e., robotic arm 81) and a second powered endpoint 83 (shown in the example of FIG. 9 as powered tool stand 83). When the robotic tool 82 is transferred to the second powered endpoint 83, the endpoint 83 powers the robotic tool 82 by applying the one or more power supplies 50 to the tool 82. In FIG. 9, for example, the powered tool stand 83 powers the robotic tool 82 with power from the power supply 50, when the tool 82 is docked with the stand 83.

Accordingly, the tool changer 10 in FIG. 9 further includes a second tool module 84 that is connected to the robotic tool 82, and a second master module 85 that is connected to the second powered endpoint 83 (i.e., the powered tool stand 83). The second master module 85 is configured to couple to and uncouple from the second tool module 84 in much the same way as described above with respect to the first master module 12 and the first tool module 14. To transfer the tool 82 between the first powered endpoint 81 and the second powered endpoint 83, therefore, the tool changer 10 coordinates the coupling and uncoupling of the first master module 12 and the first tool module 14 with the coupling and uncoupling of the second master module 85 and the second tool module 84. In one embodiment, for example, the tool changer 10 transfers the robotic tool 82 from the first powered endpoint 81 to the second powered endpoint 83 by coupling the second master module 85 and the second tool module 84 and then, shortly thereafter, uncoupling the first master module 12 and the first tool module 14. Such coordination may entail coupling and uncoupling the second master module 85 and the second tool module 84 responsive to tool electric signal module power control signals 90 that are the same as the control signals 62 discussed above.

To transfer power from the power supply 50 to the tool 82 via the second powered endpoint 83, the tool changer 10 further includes a second master electrical signal module 87 affixed to the second master module 85 and a second tool electrical signal module 86 affixed to the second tool module 84. The second master electrical signal module 87 includes endpoint-side electrical contacts 88 adapted and disposed to mate with the tool-side electrical contacts 89 when the second master and tool modules 84, 85 are coupled together. To prevent transient electric arcs from forming across these contacts 88, 89, the tool changer 10 selectively suppresses application of the one or more power supplies 50 to the second tool electrical signal module 86 during the coupling and uncoupling of the second master and tool modules 84, 85. In doing so, however, the tool changer 10 maintains application of the one or more power supplies 50 to the second master electrical signal module 87, to enable the coupling and uncoupling of the second master and tool modules 84, 85 in the first place.

Figure 10:
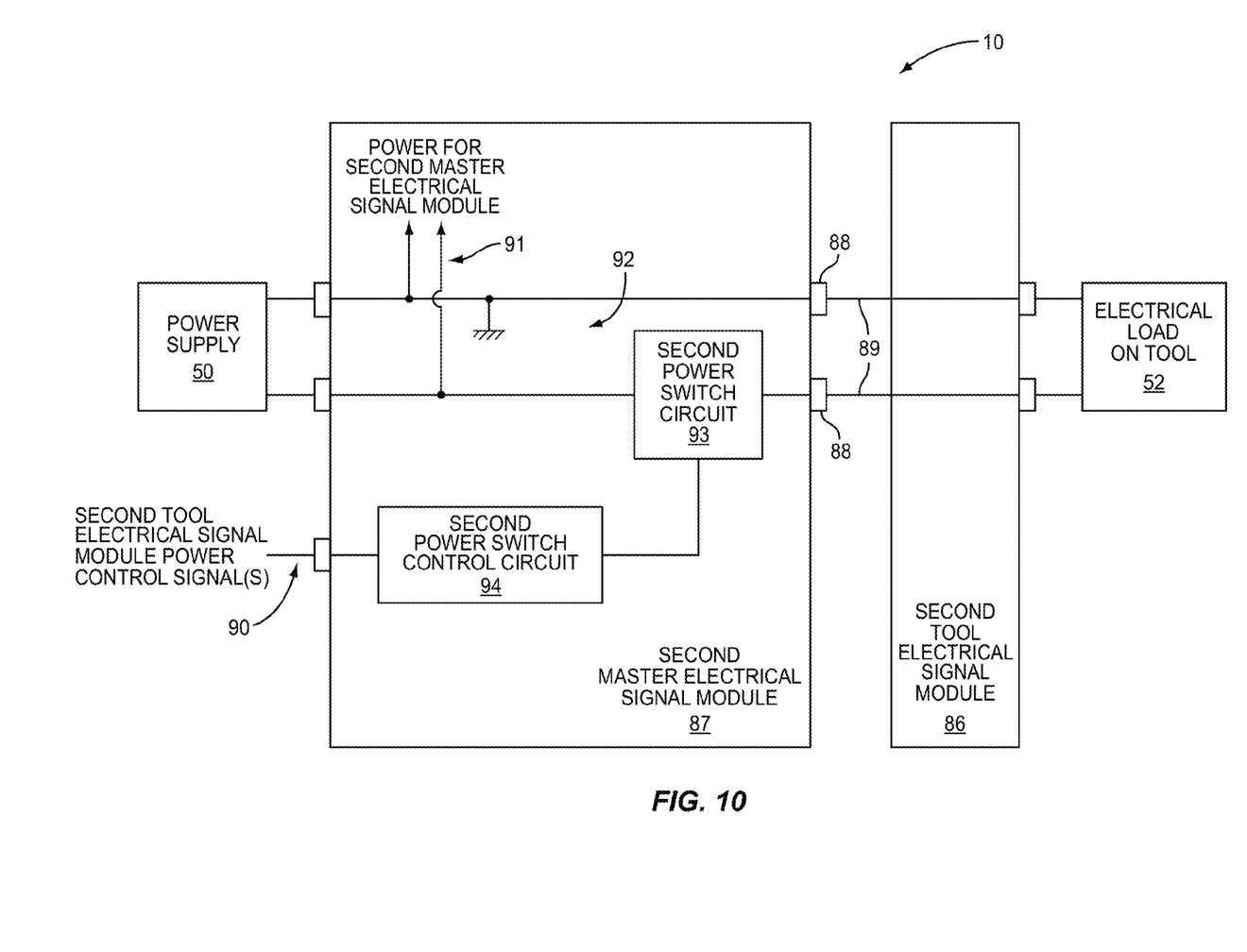
FIG. 10 is a block diagram illustrating an embodiment of a robotic tool changer that is configured to removably dock a robotic tool with a powered tool stand.

FIG. 10 illustrates additional details of the second master and tool electrical signal modules 86, 87 according to one embodiment. The one or more power supplies 50 power the second master electrical signal module 87 via a third circuit 91 connected thereto. The one or more power supplies 50 also power the second tool electrical signal module 86 via a fourth circuit 92 connected thereto that is electrically parallel to the third circuit 91. (The first and second circuits 54, 56 being those described for powering the first master and tool electrical signal modules 12, 14). A second power switch circuit 93 is disposed in series along the fourth circuit 92 in the path of one or more poles of the circuit 92. The second power switch circuit 93 is configured to selectively break or establish the fourth circuit 92, while maintaining the third circuit 91, in much the same way as described above with respect to other embodiments. For example, the second power switch circuit 93 in one embodiment is controlled by the second power switch control circuit 94. The second power switch control circuit 94 directs the second power switch circuit 93 to break or establish the fourth circuit 92 responsive to one or more second tool electrical signal module power control signals 90 (which may or may not be the same as the control signals 62 described above). Regardless, such prevents arcing across the electrical contacts 88, 89 when the second master and tool modules 86, 87 are in the process of being coupled and uncoupled. Accordingly, the second power switch circuit 93 allows the contacts 88, 89 to reach their mechanical life, while at the same time enabling the coupling and uncoupling of the modules 86, 87.

FIGS. 9 and 10 illustrated embodiments of the tool changer 10 using the transfer of a robotic tool 82 between a robotic arm, as one example of a first powered endpoint 81, and a powered tool stand as one example of a second powered endpoint 83. In some embodiments, however, the first and second powered endpoints 81, 83 comprise other types of endpoints that power the robotic tool 82.

Figure 11:
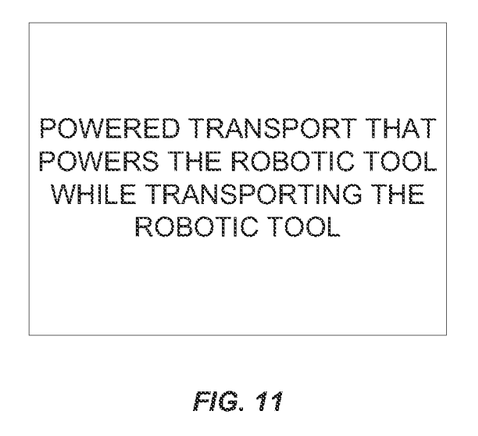
FIG. 11 schematically shows a powered transport.

In one embodiment, for example, the tool changer 10 transfers the robotic tool 82 between a robotic arm 81 and a powered transport, as another type of powered endpoint 83. A powered transport as used herein refers to any type of mechanical vehicle or the like that physically transports the robotic tool 82 (e.g., from one location to another), and that powers the robotic tool 82 during such transport. In yet other embodiments, the tool changer 10 transfers the robotic tool 82 between a powered transport and a powered tool stand. Over various embodiments, therefore, the tool changer 10 may be configured to transfer the robotic tool 10 from a powered tool stand to a powered transport, from the powered transport to a robotic arm, and vice versa, while preventing transient electric arcs from forming during each transfer.

In yet other embodiments, though, the tool changer 10 may simply be configured to removably attach the robotic tool 82 to any one powered endpoint (i.e., without regard to transferring the robotic tool 82 between that endpoint and another powered endpoint). For example, the tool changer 10 may simply be configured to removably attach the robotic tool 82 to the robotic arm 81, as described in earlier embodiments. Alternatively, the tool changer 10 may be configured to removably attach the robotic tool 82 to a powered tool stand, or a powered transport.

It should be understood, therefore, that the foregoing description and the accompanying drawings represent non-limiting examples of the methods and individual apparatuses taught herein. As such, the present invention is not limited by the foregoing description and accompanying drawings. Instead, the present invention is limited only by the following claims and their legal equivalents.

What is claimed is:

1. A robotic tool changer system configured to removably attach a robotic tool to a robotic arm, comprising:
    a first tool module adapted to be connected to the robotic tool;
    a first master module adapted to be connected to the robotic arm, and to selectively couple to and uncouple from the first tool module;
    a first master electrical signal module affixed to the first master module and a first tool electrical signal module affixed to the first tool module, both adapted to be powered by application of the same one or more power supplies; and
    a first power switch circuit configured to selectively suppress application of the one or more power supplies to the first tool electrical signal module, while maintaining application of the one or more power supplies to the first master electrical signal module, during the coupling or uncoupling of the first master module and the first tool module.

2. The robotic tool changer system of claim 1, wherein the first master electrical signal module is powered via a first circuit connected to the one or more power supplies and the first tool electrical signal module is powered via a second circuit connected to the one or more power supplies that is electrically parallel to the first circuit, and wherein the first power switch circuit is configured to selectively break or establish the second circuit, while maintaining the first circuit.

3. The robotic tool changer system of claim 1, further comprising a first power switch control circuit configured to:
    receive one or more first tool electrical signal module power control signals associated with the coupling or uncoupling of the first master module and the first tool module; and
    direct the first power switch circuit to suppress application of the one or more power supplies to the first tool electrical signal module, while maintaining application of the one or more power supplies to the first master electrical signal module, responsive to those one or more control signals.

4. The robotic tool changer system of claim 3, wherein the one or more first tool electrical signal module power control signals associated with the coupling or uncoupling of the first master module and the first tool module comprise either:
    an explicit control command that indicates whether to turn power on or off to the first tool electrical signal module; or
    sensing signals that collectively indicate whether the first master module and the first tool module are physically close and whether the first master module and the first tool module have been locked together; or
    a sensing signal that indicates whether the first master module and the first tool module have been locked together; or
    a sensing signal that indicates if both the first master module and the first tool module are physically close and a physically recessed electrical contact is engaged; or
    a control command to lock or unlock the first master module and the first tool module, and a sensing signal that indicates whether all electrical contacts between the first master module and the first tool module are engaged.

5. The robotic tool changer system of claim 1, wherein the first master electrical signal module and the first tool electrical signal module include robot-side electrical contacts and tool-side electrical contacts, respectively, that are adapted and disposed to mate with one another and to pass electrical power therebetween when the first master module and the first tool module are coupled together, and wherein the first power switch circuit is configured to:
    prevent transient electric arcs from forming across said robot-side and tool-side electrical contacts by suppressing application of the one or more power supplies to the first tool electrical signal module during the coupling or uncoupling of the first master module and the first tool module; and
    enable the coupling or uncoupling of the first master module and the first tool module by maintaining application of the one or more power supplies to the first master electrical signal module.

6. The robotic tool changer system of claim 1, further comprising at least one of:
    a current limiting circuit configured to limit the current passing through the first power switch circuit to be at or below a given inrush current; and
    a voltage limiting circuit configured to clip voltage spikes falling across the first power switch circuit to be at or below a given voltage spike.

7. The robotic tool changer system of claim 1, wherein the robotic tool changer system is further configured to transfer the robotic tool between the robotic arm and a powered endpoint, the robotic tool changer system further comprising:
    a second tool module adapted to also be connected to the robotic tool;
    a second master module adapted to be connected to said powered endpoint, and to selectively couple to and uncouple from the second tool module in coordination with the coupling and uncoupling of the first master module and the first tool module;
    a second master electrical signal module affixed to the second master module and a second tool electrical signal module affixed to the second tool module, both adapted to be powered by application of the one or more power supplies; and
    a second power switch circuit configured to selectively suppress application of the one or more power supplies to the second tool electrical signal module, while maintaining application of the one or more power supplies to the second master electrical signal module, during the coupling or uncoupling of the second master module and the second tool module.

8. The robotic tool changer system of claim 7, wherein the second master electrical signal module is powered via a third circuit connected to the one or more power supplies and the second tool electrical signal module is powered via a fourth circuit connected to the one or more power supplies that is electrically parallel to the third circuit, and wherein the second power switch circuit is configured to selectively break or establish the fourth circuit, while maintaining the third circuit.

9. The robotic tool changer system of claim 7, wherein the second master electrical signal module and the second tool electrical signal module include endpoint-side electrical contacts and tool-side electrical contacts, respectively, that are adapted and disposed to mate with one another and to pass electrical power therebetween when the second master module and the second tool module are coupled together, and wherein the second power switch circuit is configured to:
    prevent transient electric arcs from forming across said endpoint-side and said tool-side electrical contacts by suppressing application of the one or more power supplies to the second tool electrical signal module during the coupling or uncoupling of the second master module and the second tool module; and enable the coupling or uncoupling of the second master module and the second tool module by maintaining application of the one or more power supplies to the second master electrical signal module.

10. The robotic tool changer system of claim 7, wherein the powered endpoint comprises either:

a powered tool stand that powers the robotic tool when docked therewith; or a powered transport that powers the robotic tool while transporting the robotic tool.

11. A method, implemented by a robotic tool changer system, for removably attaching a robotic tool to a robotic arm by selectively coupling and uncoupling a first tool module connected to the robotic tool and a first master module connected to the robotic arm, the method comprising:

applying the same one or more power supplies to power both a first master electrical signal module, affixed to the first master module, and a first tool electrical signal module, affixed to the first tool module; and during the coupling or uncoupling of the first master module and the first tool module, and by a power switch circuit of the robotic tool changer system, selectively suppressing application of the one or more power supplies to the first tool electrical signal module, while maintaining application of the one or more power supplies to the first master electrical signal module.

12. A robotic tool changer system configured to removably attach a robotic tool to a first powered endpoint, comprising:

a first tool module adapted to be connected to the robotic tool;

a first master module adapted to be connected to the powered endpoint, and to selectively couple to and uncouple from the first tool module;

a first master electrical signal module affixed to the first master module and a first tool electrical signal module affixed to the first tool module, both adapted to be powered by application of the same one or more power supplies; and a first power switch circuit configured to selectively suppress application of the one or more power supplies to the first tool electrical signal module, while maintaining application of the one or more power supplies to the first master electrical signal module, during the coupling or uncoupling of the first master module and the first tool module.

13. The robotic tool changer system of claim 12, wherein the first master electrical signal module is powered via a first circuit connected to the one or more power supplies and the first tool electrical signal module is powered via a second circuit connected to the one or more power supplies that is electrically parallel to the first circuit, and wherein the first power switch circuit is configured to selectively break or establish the second circuit, while maintaining the first circuit.

14. The robotic tool changer system of claim 12, wherein the first master electrical signal module and the first tool electrical signal module include endpoint-side electrical contacts and tool-side electrical contacts, respectively, that are adapted and disposed to mate with one another and to pass electrical power therebetween when the first master module and the first tool module are coupled together, and wherein the first power switch circuit is configured to:

prevent transient electric arcs from forming across said endpoint-side and tool-side electrical contacts by suppressing application of the one or more power supplies to the first tool electrical signal module during the coupling or uncoupling of the first master module and the first tool module; and enable the coupling or uncoupling of the first master module and the first tool module by maintaining application of the one or more power supplies to the first master electrical signal module.

15. The robotic tool changer system of claim 12, wherein the robotic tool changer system is further configured to transfer the robotic tool between the first powered endpoint and a second powered endpoint, the robotic tool changer system further comprising:

a second tool module adapted to also be connected to the robotic tool;

a second master module adapted to be connected to the second powered endpoint, and to selectively couple to and uncouple from the second tool module in coordination with the coupling and uncoupling of the first master module and the first tool module;

a second master electrical signal module affixed to the second master module and a second tool electrical signal module affixed to the second tool module, both adapted to be powered by application of the one or more power supplies; and a second power switch circuit configured to selectively suppress application of the one or more power supplies to the second tool electrical signal module, while maintaining application of the one or more power supplies to the second master electrical signal module, during the coupling or uncoupling of the second master module and the second tool module.

16. The robotic tool changer system of claim 15, wherein the first and second powered endpoints comprise, respectively:

a robotic arm and a powered transport that powers the robotic tool while transporting the robotic tool; or a powered transport and a powered tool stand that powers the robotic tool when docked therewith; or a robotic arm and a powered tool stand.

17. A method implemented by a robotic tool changer system for removably attaching a robotic tool to a first powered endpoint, by selectively coupling and uncoupling a first tool module connected to the robotic tool and a first master module connected to the powered endpoint, the method comprising:

applying the same one or more power supplies to power both a master electrical signal module, affixed to the master module, and a tool electrical signal module, affixed to the tool module; and during the coupling or uncoupling of the master module and the tool module, and by a power switch circuit of the robotic tool changer system, selectively suppressing application of the one or more power supplies to the tool electrical signal module, while maintaining application of the one or more power supplies to the master electrical signal module.

* * * * *